US008531508B2

(12) United States Patent
Sato

(10) Patent No.: US 8,531,508 B2
(45) Date of Patent: Sep. 10, 2013

(54) 3D IMAGE CONTROL APPARATUS AND METHOD

(75) Inventor: Yuzo Sato, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 13/176,555

(22) Filed: Jul. 5, 2011

(65) Prior Publication Data
US 2011/0261054 A1    Oct. 27, 2011

Related U.S. Application Data

(63) Continuation of application No. PCT/JP2011/051351, filed on Jan. 25, 2011.

(30) Foreign Application Priority Data

Mar. 2, 2010    (WO) .................. PCT/JP2010/053301

(51) Int. Cl.
*H04N 13/00*    (2006.01)

(52) U.S. Cl.
USPC ................. 348/53; 348/43; 348/51; 348/751; 345/63; 345/98; 345/419

(58) Field of Classification Search
USPC .............................. 348/43–751; 345/63–419
See application file for complete search history.

(56) References Cited

U.S. PATENT DOCUMENTS

| 5,945,972 | A * | 8/1999 | Okumura et al. | 345/98 |
| 2008/0129893 | A1* | 6/2008 | Aoki | 348/751 |
| 2011/0090308 | A1* | 4/2011 | Chen et al. | 348/43 |

FOREIGN PATENT DOCUMENTS

| JP | 11-098540 A | 4/1999 |
| JP | 2000-250463 A | 9/2000 |
| JP | 2004-104330 A | 4/2004 |
| JP | 2005-295591 A | 10/2005 |
| JP | 2009-31523 A | 2/2009 |

OTHER PUBLICATIONS

Search—history_from—INSPEC.pdf.*

* cited by examiner

*Primary Examiner* — William C Vaughn, Jr.
*Assistant Examiner* — Luis M Perez Fuentes
(74) *Attorney, Agent, or Firm* — Canon U.S.A., Inc. IP Division

(57) ABSTRACT

A 3D image control apparatus is provided which prevents unevenness of luminance in an observed image on a screen caused in a 3D image viewing system including an impulse type display device and liquid crystal shutter glasses.

The 3D image control apparatus includes an image processing unit configured to generate luminance signals for displaying a right eye image and a left eye image on the basis of an input image signal and output the signals to a display unit. The image processing unit performs arithmetic operation on an image signal corresponding to pixels on a predetermined number of vertical lines using correction values for increasing a luminance in accordance with the position of each vertical line so that a lack of transmittance for a rising period or falling period of shutters of liquid crystal shutter glasses is compensated for, thus generating luminance signals.

10 Claims, 9 Drawing Sheets

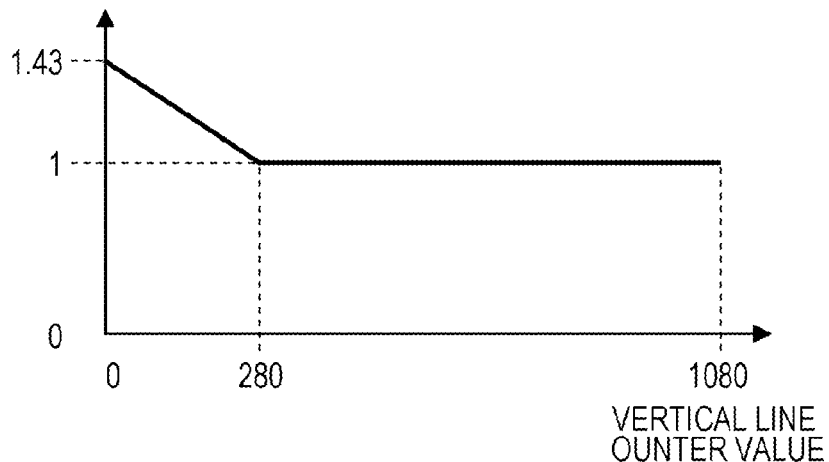
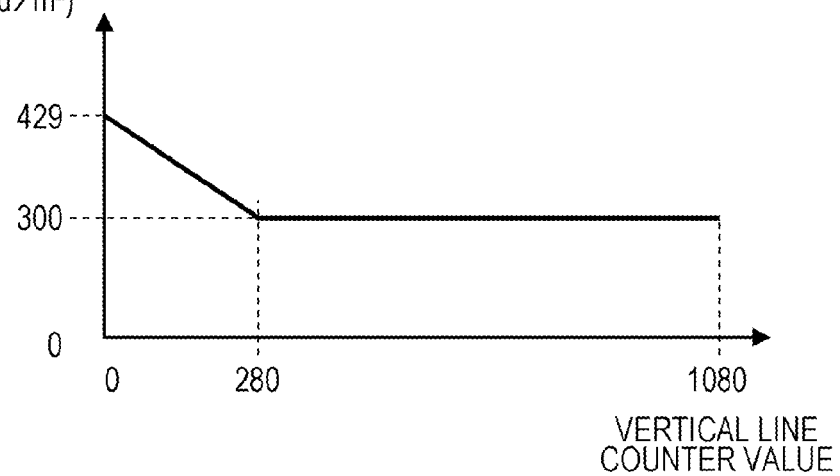
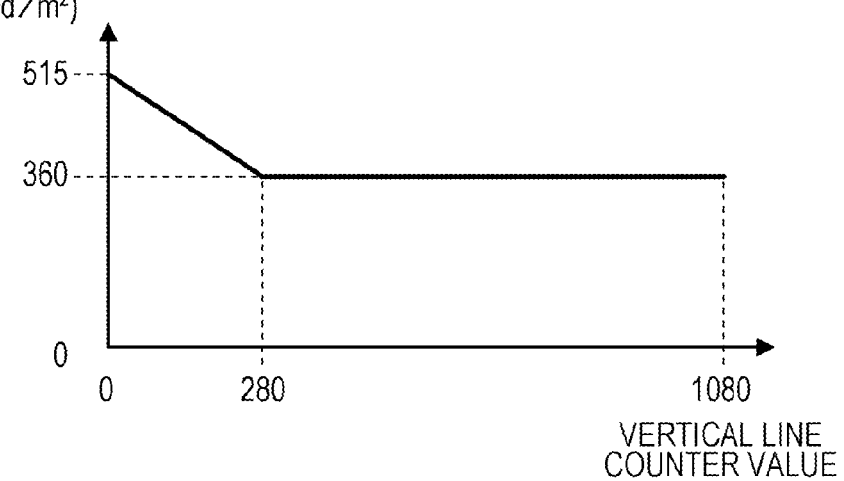

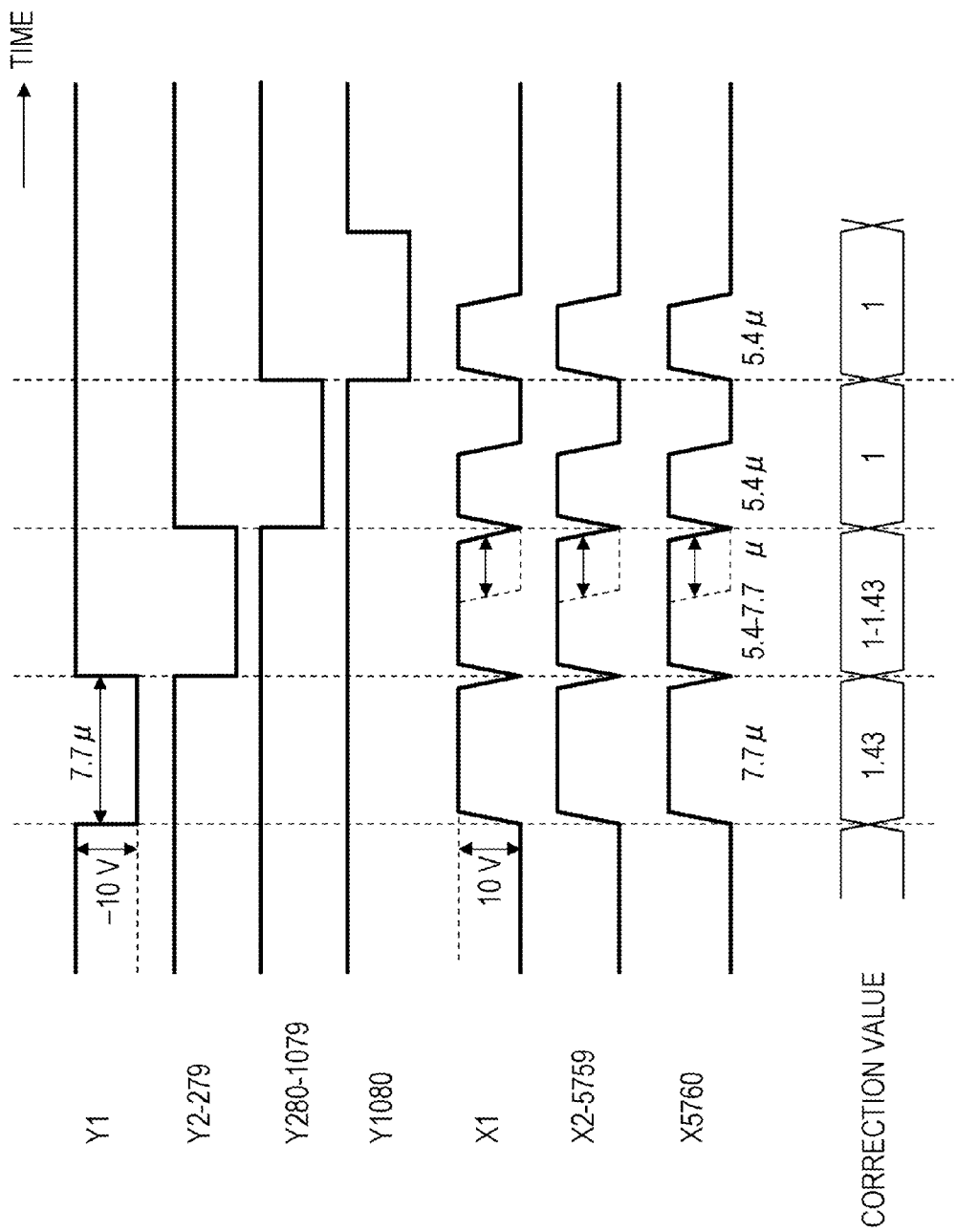

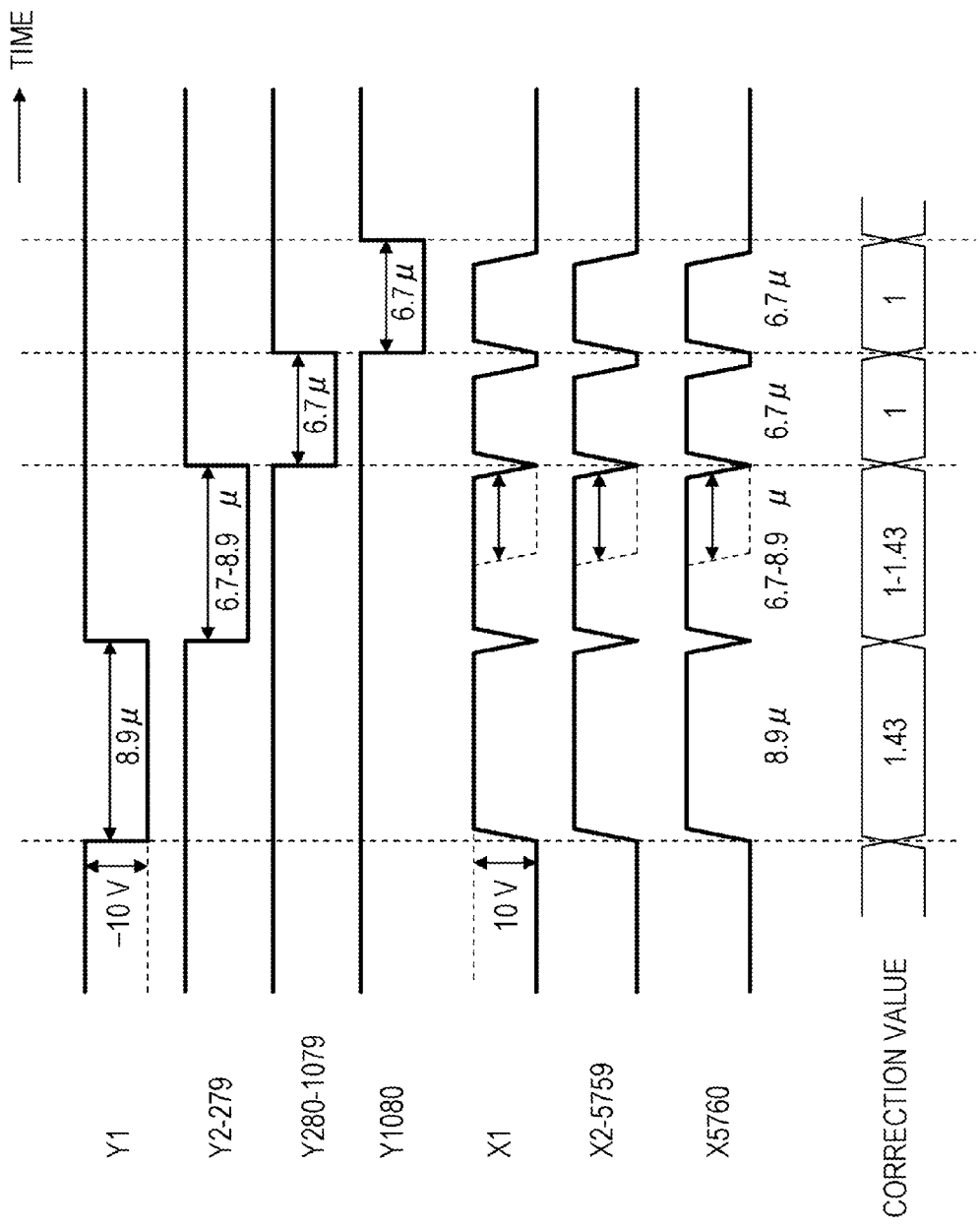

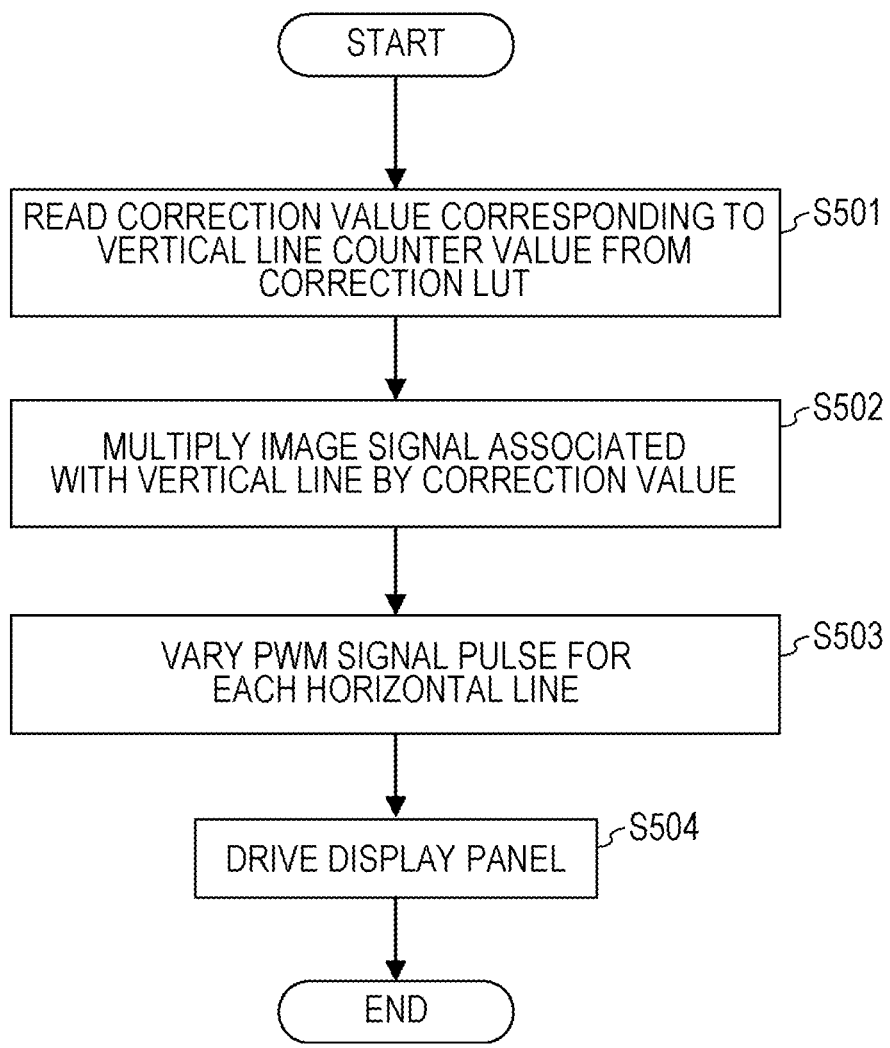

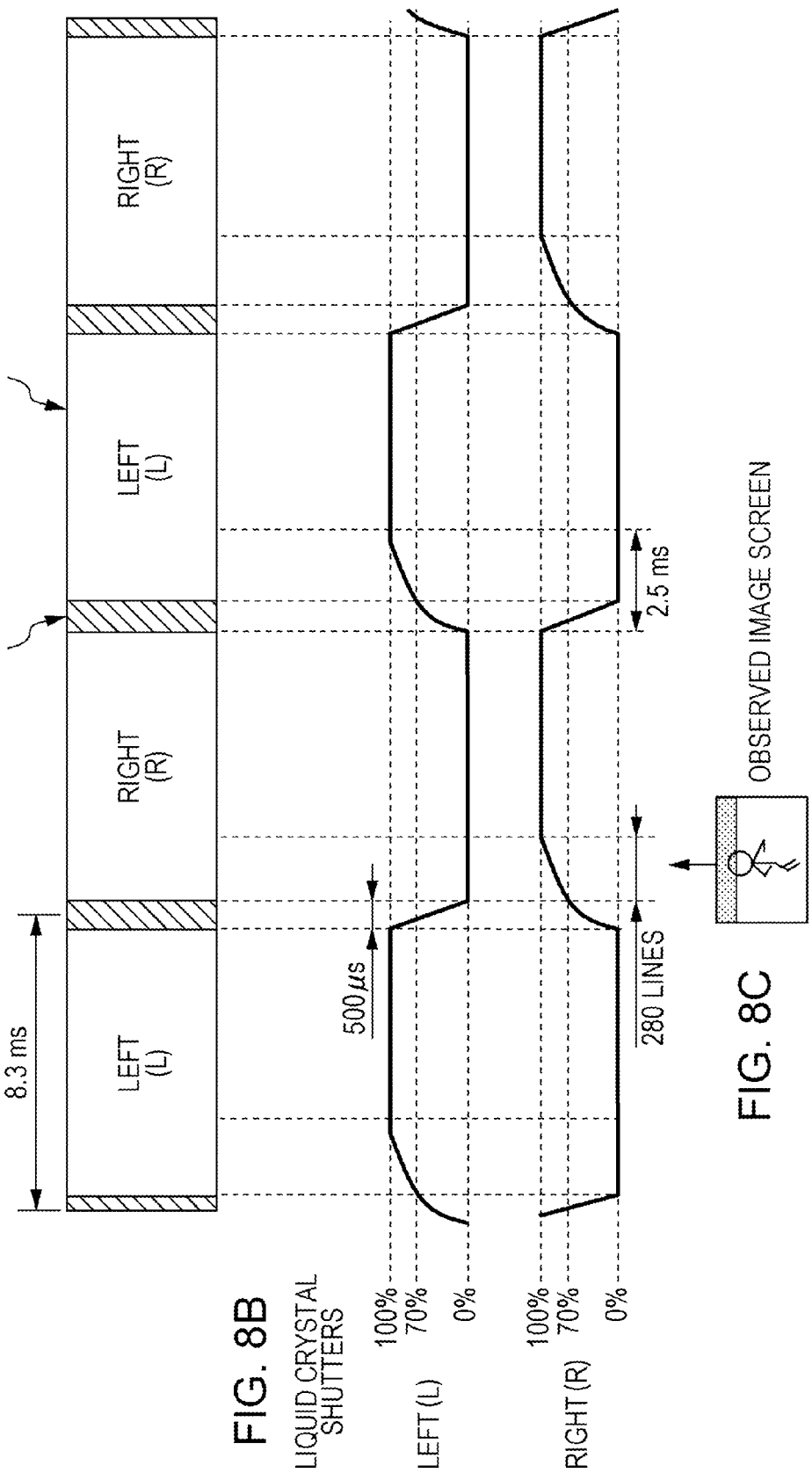

3D IMAGE CONTROL APPARATUS AND METHOD

CROSS-REFERENCE TO RELATED APPLICATIONS

This application is a Continuation of International Patent Application No. PCT/JP2011/051351, filed Jan. 25, 2011, which claims the benefit of International Patent Application No. PCT/JP2010/053301, filed Mar. 2, 2010, both of which are hereby incorporated by reference herein in their entirety.

TECHNICAL FIELD

The present invention relates to a 3D image control apparatus and method for allowing an image displayed through an impulse type display device to be viewed as a three-dimensional (3D) image.

BACKGROUND ART

A 3D image viewing system has been known in which an image display device alternately displays a right eye image and a left eye image in a time-division manner and the images are observed through shutter glasses alternately opening and closing right and left shutters synchronously with switching between the right eye image and the left eye image so that a 3D image is viewable.

The following Patent Literature 1 discloses a 3D image display device that alternately displays a right eye image and a left eye image every two frames to prevent crosstalk caused when a frame rate is increased.

CITATION LIST

Patent Literature

PTL 1 Japanese Patent Laid-Open No. 2009-31523

A problem will be described which is caused when 3D images displayed through an impulse type display device are stereoscopically viewed as observed images through liquid crystal shutter glasses. The display device sequentially selects pixels on a scanning line out of pixels arranged in a matrix form every predetermined addressing period (scanning selection period) to generate an image of one frame. The impulse type display device is a display device that generates an image in such a manner that the luminance of each pixel turned on for an addressing period is not held for one frame but the pixel is turned on and off within the addressing period. The luminance of the pixel turned on synchronously with the start of an addressing period reaches a luminance based on an image signal and then reaches zero with a decay period, which is shorter than one frame period, specific to a display device. Typical examples include a CRT, an FED (Field Emission Display), and a DLP (Digital Light Processing).

FIGS. 8A and 8B illustrate the relationship between display periods of images generated by multiplex driving and shutter opening and closing timing. A frame frequency of 120 Hz is set. A left eye image (left frame) and a right eye image (right frame) are alternately displayed every frame. Left and right shutters open and close synchronously with the left and right frames.

As regards liquid crystal shutters, in a normally white mode, a close-to-open response speed (rising period) is lower than an open-to-close response speed (falling period) and they are about 2.5 msec and about 500 μsec, respectively. In a normally black mode, the relationship between rising and falling is opposite to the above.

To receive both of the rising and falling period of the shutters within a vertical blanking period (hereinafter, blanking period), the blanking period accounts for ¼ or more of a vertical scanning period. As a result, a horizontal scanning period becomes shorter. To perform gradation display by pulse width modulation, therefore, the display luminance is reduced and the dynamic range is also narrowed.

As illustrated in FIG. 8B, when each blanking period is set so as to match the falling period of the shutters, the rising period of the shutters overlaps a display period by 2 msec. As a result, the transmittance of the shutters decreases by 30%. An observed image includes a dark belt-like portion corresponding to a region of 280 lines in upper part of a screen, as illustrated in FIG. 8C.

Similarly, in the normally black mode, when the blanking period is set so as to match the rising period of each shutter and the shutter is closed during the next blanking period, the falling period of the shutter overlaps the display period by 2 msec. As a result, the transmittance of the shutters decreases by 30%. Contrary to FIG. 8C, an observed image includes a dark belt-like portion corresponding to a region of 280 lines in lower part of the screen.

The related-art 3D image viewing system including the impulse type display device and the liquid crystal shutter glasses has the above-described unevenness of luminance in an observed image on a screen.

SUMMARY OF INVENTION

The present invention provides a 3D image control apparatus that allows an impulse type display unit to alternately display a right eye image and a left eye image in a time-division manner and allows right and left shutters of shutter glasses to alternately open and close synchronously with switching between the right eye image and the left eye image so that a 3D image is viewed, the apparatus including:

an input unit configured to receive an image signal for displaying a 3D image; and an image processing unit configured to generate luminance signals for displaying the right eye image and the left eye image on the basis of the image signal and output the signals to the display unit, wherein the display unit sequentially selects scanning lines in order from a scanning line at which scanning starts to a scanning line at which the scanning ends for a predetermined vertical scanning period to generate an image on a screen, and the image processing unit corrects the image signal such that the luminances of pixels on each of a predetermined number of scanning lines, succeedingly scanned from at least one of the scanning line at which the scanning starts and the scanning line at which the scanning ends, are increased relative to those of pixels on scanning lines other than the predetermined number of scanning lines in accordance with the position of the scanning line.

Further features of the present invention will become apparent from the following description of exemplary embodiments with reference to the attached drawings.

BRIEF DESCRIPTION OF DRAWINGS

FIGS. 3A to 3C are graphs each explaining the relationship between a vertical line counter value and a correction value or luminance.

FIG. 4A is a timing chart illustrating the waveforms of driving pulses according to the present invention.

FIG. 4B is a timing chart illustrating the waveforms of driving pulses according to the present invention.

FIG. 5 is a flowchart of an operation according to an embodiment of the present invention.

FIGS. 8A to 8C are diagrams explaining a problem related to 3D image viewing through an impulse type display device.

DESCRIPTION OF EMBODIMENTS

Embodiments of the present invention will be described below with reference to the drawings. Roughly speaking, the present invention is to allow a display device to compensate for a lack of transmittance in the rising period or falling period of shutters of liquid crystal shutter glasses. Specifically, the luminances of pixels on each of vertical lines scanned for a period corresponding to the rising period or falling period are monotonically increased relative to the luminances of pixels on vertical lines other than the vertical lines in accordance with the position or scan order of the vertical line.

Alternatively, the luminances of pixels on each of vertical lines scanned for periods corresponding to the rising period and the falling period may be monotonically increased relative to the luminances of pixel on vertical lines other than the vertical lines in accordance with the position or scan order of the vertical line.

First Embodiment

Figure 1:
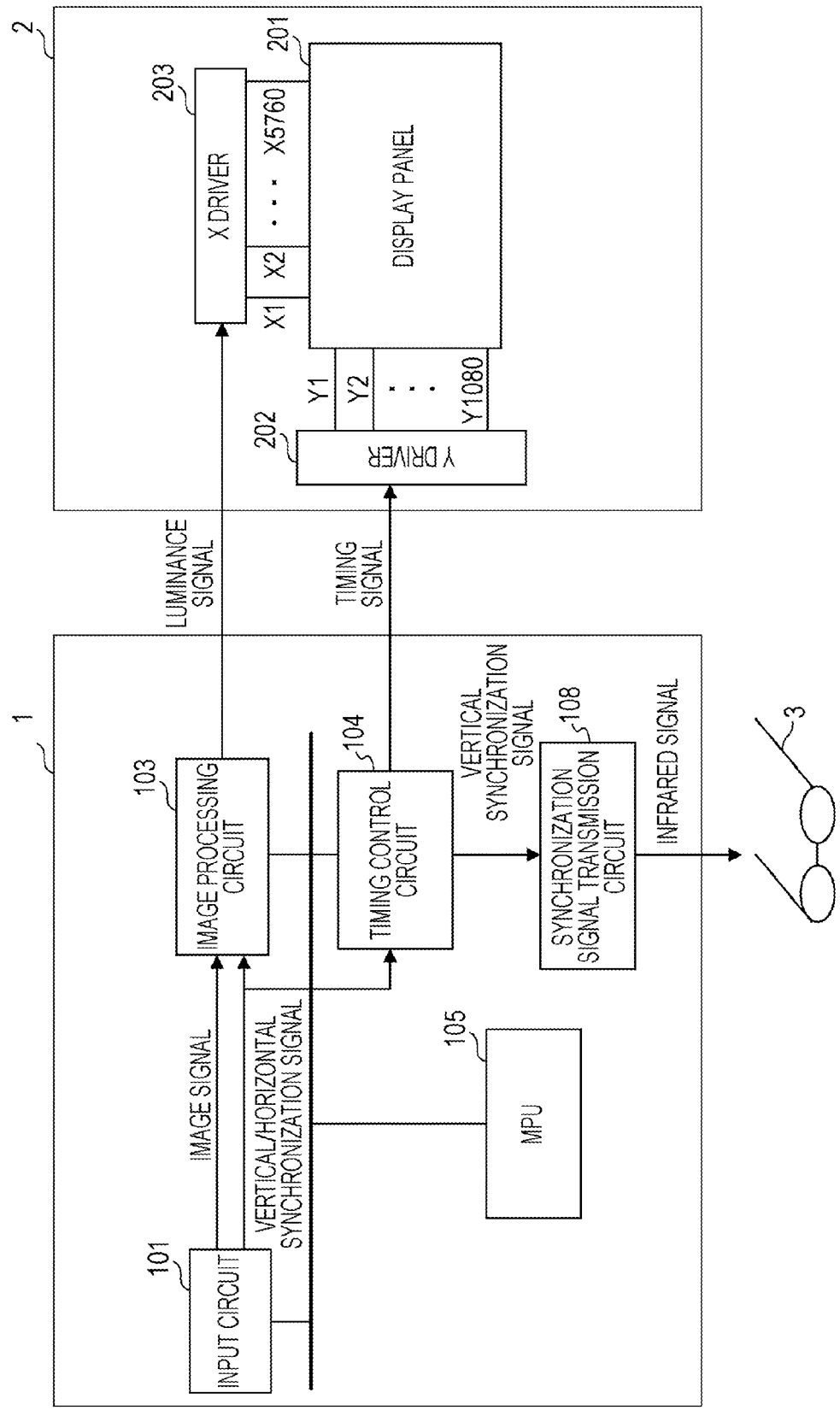
FIG. 1 is a block diagram of a 3D image viewing system according to the present invention.

FIG. 1 is a block diagram of a 3D image viewing system according to the present invention which includes a 3D image control apparatus 1, a display device 2, and liquid crystal shutter glasses 3.

The display device 2, serving as an impulse type display device, includes a surface-conduction electron-emitter display panel (hereinafter, display panel) 201, and an X driver 203 and a Y driver 202 for driving the display panel. The configuration of the display panel and a method of making the same are disclosed in detail in Japanese Patent Laid-Open No. 2000-250463. The display panel includes a plurality of pixels (1920×3×1080), arranged in a matrix form, including a plurality of vertical lines (scanning lines) and a plurality of horizontal lines (signal lines). The display panel generates an image on a screen by sequentially selecting vertical lines in order from a vertical line, which is positioned at the top of the screen and at which scanning starts, to a vertical line which is positioned at the bottom of the screen and at which the scanning ends, namely, downward in the screen. Driving pulses based on a luminance signal are applied to horizontal lines in a parallel manner synchronously with the multiplex scanning. A frame rate (refresh rate) for multiplex scanning is 120 Hz.

The 3D image control apparatus 1 includes the following elements. An input circuit 101 receives a 3D image signal from an input source and outputs an image signal and a vertical/horizontal synchronization signal. The input source includes a television broadcast, an image content distribution system via the Internet, and a video player. The input circuit 101 includes a digital tuner and an input interface. The image signal comprises a right eye image signal and a left eye image signal each having a resolution of (1920×1080) and the signals are alternately switched every frame at 120 Hz.

An image processing circuit 103 adjusts luminance levels of the image signal, converts the image signal to luminance signals conforming to the specifications of the display device 2, and outputs the luminance signals to the X driver 203. The X driver 203 generates driving pulses associated with the luminance levels on the basis of the luminance signals to PWM (Pulse Width Modulation) drive the display panel 201.

A timing control circuit 104 outputs a timing signal for controlling a horizontal scanning period (1H) and a vertical scanning period (1V) on the basis of the vertical/horizontal synchronization signal to the Y driver 202. A synchronization signal transmission circuit 108 transmits an infrared signal for controlling opening and closing of right and left shutters of the liquid crystal shutter glasses 3 through infrared communication on the basis of a vertical synchronization signal output from the timing control circuit 104. An MPU (control unit) 105 controls the respective blocks jointly.

The liquid crystal shutter glasses 3 receive the infrared signal to open and close the right and left shutters synchronously with switching between the right and left eye image signals. In the following description, it is assumed that an operation for opening and closing the liquid crystal shutters is performed in the normally white mode. The operation may also be performed in the normally black mode. In the normally black mode, the relationship between the rising and falling of the liquid crystal shutters is reversed against the normally white mode.

Figure 2:
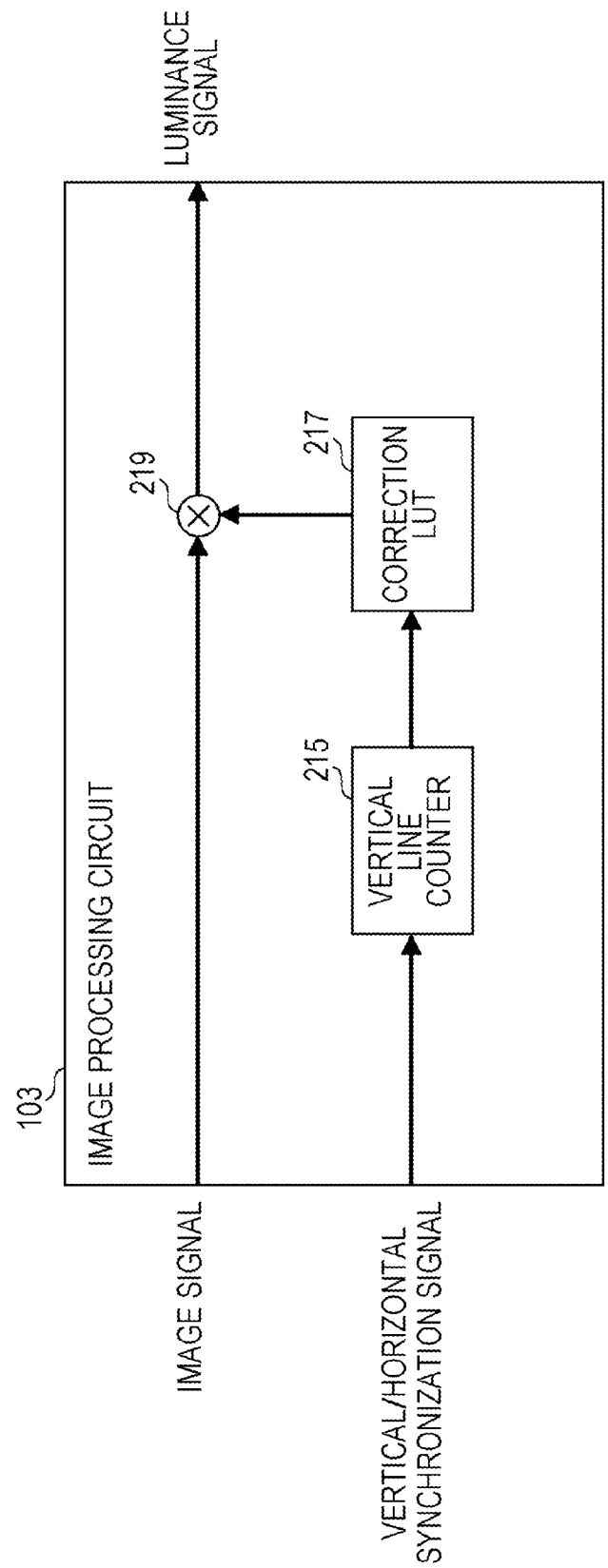
FIG. 2 is a block diagram of an image processing circuit according to the present invention.

FIG. 2 is a block diagram of luminance correction part of the image processing circuit 103. A correction LUT (look-up table) 217 has stored correction values associated with the respective vertical lines. A vertical line counter 215 starts counting of the vertical line on the basis of the vertical synchronization signal of the vertical/horizontal synchronization signal and proceeds with the counting on the basis of a horizontal synchronization signal to specify the position of a vertical line. The vertical line counter 215 inputs a vertical line counter value corresponding to the position of the vertical line to the correction LUT 217. The correction LUT 217 outputs a correction value associated with the vertical line counter value. A multiplier 219 multiplies an image signal, corresponding to pixels on each vertical line, by a correction value associated with the vertical line to output a luminance signal.

Correction values are determined so that the luminances of pixels on each of a predetermined number of vertical lines succeedingly scanned from the vertical line at which scanning starts are increased relative to those of pixels on the other vertical lines in accordance with the position of the vertical line.

FIG. 3A illustrates the relationship between the correction values stored in the correction LUT 217 and vertical line counter values. The correction values for vertical line counter values 1 to 280 are set in the range of 1.43 to 1.0 and those for vertical line counter values 280 to 1080 are set to 1.0.

FIG. 3B illustrates the relationship between a luminance in the display panel 201 for a luminance signal at a luminance level of 100% (maximum luminance) and a vertical line counter value. A luminance for each of the vertical line counter values 280 to 1080 is set to 300 cd/m$^2$ and a luminance for a vertical line counter value 1 is set to 429 cd/m$^2$ in association with the set correction values.

FIG. 4A illustrates the waveforms of driving pulses output from the X driver 203 and the Y driver 202. The Y driver 202 sequentially outputs a scanning pulse having a height of −10 V and a width of 7.7 μsec to the vertical lines (Y1 to Y1080).

The X driver 203 applies signal pulses to the respective horizontal lines (X1 to X5760) in a parallel manner synchronously with the scanning pulse. The height of each signal pulse is +10 V and the width thereof changes from 0 to 7.7 μsec in accordance with a luminance signal. When the luminance level is 100%, signal pulses synchronized with Y1 have a maximum pulse width of 7.7 μsec (correction value of 1.43) in order to compensate for a 30% reduction in transmittance of the shutters, as described with reference to FIGS. 8A to 8C. As for signal pulses synchronized with Y2 to Y279, the widths of driving pulses for the vertical lines are varied such that the width monotonically decreases from 7.7 to 5.4 μsec (correction values of 1.43 to 1.0) in accordance with the response waveform of the shutters. As for signal pulses synchronized with Y280 to Y1080, the width of each driving pulse is set to 5.4 μsec (correction value of 1.0).

The correction values may be changed on the basis of an average luminance level (APL) of an input image signal. Specifically, when the APL is less than or equal to a predetermined value, the correction value is set to a value (for example, 1.4 to 2.0) larger than that when it is greater than the predetermined value so that luminance on the entire screen is maintained. At this time, a luminance signal for a pixel for which the pulse width exceeds its maximum is limited to a maximum luminance signal value by overflow processing.

The number of vertical lines, for which correction values are changed in a monotonic decreasing manner, is determined in accordance with the rising period of the shutters. As for a change in correction value, the correction values for Y1 to Y280 are linearly changed. They may be changed in accordance with a curve corresponding to a change in transmittance for the rising period of the shutters. A vertical blanking period set within the vertical scanning period is determined in accordance with the falling period of the shutters, as illustrated in FIGS. 8A and 8B.

The number of vertical lines for which the correction values are varied can also be determined so as to include the vertical line at which the scanning ends in accordance with the falling period of the shutters. In this case, the liquid crystal shutters are operated in the normally black mode and the rising period of the shutters is set so as to be within the vertical blanking period.

Furthermore, the number of vertical lines for which the correction values are changed can also be determined so as to include both of the vertical line at which the scanning starts and the vertical line at which the scanning ends in accordance with the rising period and falling period of the shutters, respectively. In this case, both of the rising period and the falling period of the shutters are set so as not to be within the vertical blanking period. Luminances are corrected for pixels on vertical lines corresponding to a period in which the rising period of the shutters runs over the vertical blanking period and overlaps the image display period and a period in which the falling period thereof runs over the vertical blanking period and overlaps the image display period.

As regards a process of performing arithmetic operation on an image signal using correction values to generate luminance signals, addition may be used instead of multiplication.

As for the impulse type display device, a Spindt type field emission display panel may be used.

FIG. 5 is a flowchart of a driving process performed under the control of the MPU 105. A vertical line counter value is calculated on the basis of a vertical/horizontal synchronization signal and a correction value for each vertical line is read from the correction LUT 217 (S501). An image signal is multiplied by the correction value associated with the vertical line (S502). The corrected image signal is output to the X driver 203, thus varying a signal pulse width for each horizontal line (S503). Driving pulses are applied to the display panel to display a right eye image and a left eye image in a time-division manner (S504).

Second Embodiment

In a 3D image viewing system according to the present embodiment, a frame memory is further included in the 3D image control apparatus 1 in the block diagram of FIG. 1. The frame memory stores luminance signals, output from the image processing circuit 103, for one frame.

Figure 6:
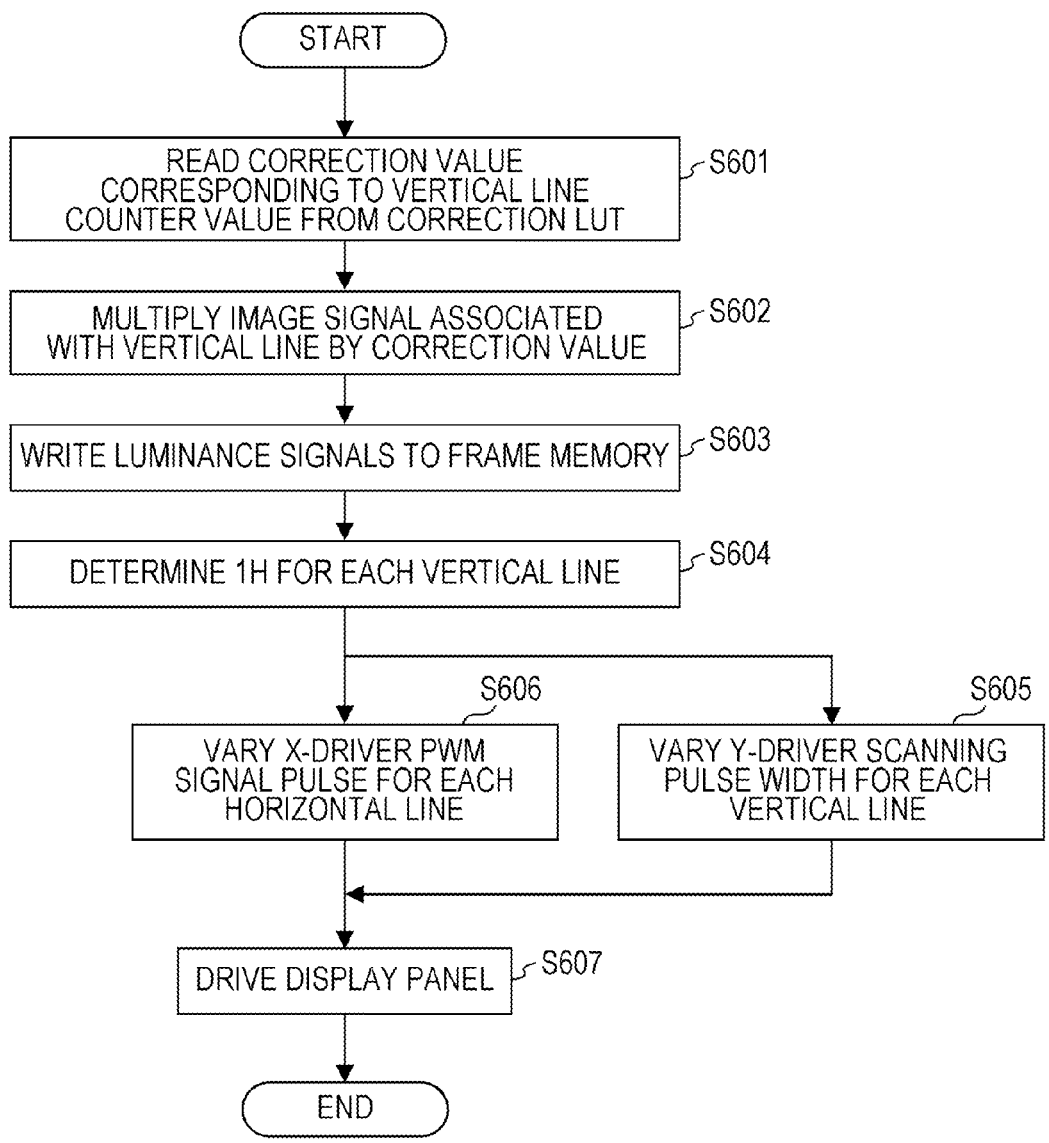
FIG. 6 is a flowchart of an operation according to another embodiment of the present invention.

An operation of the 3D image viewing system will be described with reference to a flowchart of FIG. 6. A vertical line counter value is calculated on the basis of a vertical/horizontal synchronization signal and a correction value is read from the correction LUT 217 (S601) in a manner similar to the first embodiment. The multiplier 219 multiplies an image signal by the correction value associated with a vertical line (S602).

Luminance signals output from the image processing circuit 103 are written as much as one frame to the frame memory (S603). The MPU 105 detects a maximum luminance level for each vertical line from the stored luminance signals of one frame to determine a horizontal scanning period (1H) for the vertical line in accordance with the maximum luminance level. In other words, when the maximum luminance level is high, 1H is lengthened. When the maximum luminance level is low, 1H is shortened. In addition, 1H for each vertical line is adjusted every frame so that a vertical scanning period for one frame is not changed (S604).

The timing control circuit 104 reads luminance data from the frame memory on the basis of an instruction from the MPU 105 and outputs the data to the X driver 203 synchronously with 1H for each vertical line (S606). Furthermore, the timing control circuit 104 outputs a timing signal associated with 1H for each vertical line to the Y driver 202 on the basis of the vertical/horizontal synchronization signal (S605). While 1H is varied for each vertical line, driving pulses are output from the drivers, thus driving the display panel (S607). Since the vertical scanning period is constant, a vertical synchronization signal output from the timing transmission circuit 104 to the synchronization signal output circuit 108 is generated on the basis of the vertical/horizontal synchronization signal in a manner similar to the first embodiment.

FIG. 4B illustrates the waveforms of driving pulses. The second embodiment differs from the first embodiment in the waveforms of driving pulses such that since 1H differs from vertical line to vertical line, each of the widths of a scanning pulse and each signal pulse differs from vertical line to vertical line (the heights are constant, −10 V and +10 V). It is assumed that 1H associated with a luminance of 100% is set for Y1 and Y280 to Y1080 and 1H associated with a luminance signal is set for each of other vertical lines (Y2 to Y279). When a maximum luminance signal is input to each horizontal line for the set 1H, the width of each signal pulse synchronized with Y1 is 8.9 μsec (correction value of 1.43) and the width of each signal pulse synchronized with each of Y280 to Y1080 is 6.7 μsec (correction value of 1.0). The widths of signal pulses synchronized with Y2 to Y279 are varied in the range of 8.9 to 6.7 μsec (correction values of 1.43 to 1.0) in accordance with the vertical lines.

The number of vertical lines for which correction values are varied in a monotonic decreasing manner is determined in accordance with the rising period of the shutters in the same way as the first embodiment. Although correction values for Y1 to Y280 are linearly varied, they may be varied in accordance with a curve corresponding to a change in transmittance for the rising period of the shutters.

FIG. 3C illustrates the relationship between a luminance and a vertical line counter value. 1H for each vertical line is adjusted in accordance with an input image signal, so that luminance levels in the whole of one frame image are increased. A luminance for a correction value of one time is 360 cd/m$^2$ and a luminance for a correction value of 1.43 times is 515 cd/m$^2$.

Third Embodiment

In the first embodiment, the X driver 203 outputs signal pulses having widths varied in accordance with luminance signals to PWM drive the display panel 201. According to the present embodiment, the X driver 203 outputs signal pulses having heights varied in accordance with luminance signals to PHM (Pulse Height Modulation) drive the display panel 201.

The Y driver 202 sequentially applies a scanning pulse having a height of −10 V and a width of 7.7 μsec to the vertical lines. The X driver 203 applies signal pulses having a constant width (5.4 μsec) and a height (in the range of 0 V to 10 V) according to a luminance signal to the horizontal lines in a parallel manner synchronously with the scanning pulse.

In the case of a luminance of 100%, a signal pulse synchronized with Y1 has a height of 10 V (correction value of 1.43) and a signal pulse synchronized with each of Y280 to Y1080 has a height of 8 V (correction value of 1.0). The heights of signal pulses synchronized with Y2 to Y279 are varied in the range of 10 V to 8 V (correction values of 1.43 to 1.0) in association with the vertical lines (the change of correction value is monotonic decrease).

In other words, the present invention is also applicable to PHM driving.

Other Embodiments

According to another embodiment, the display panel 201 can be driven in the combination of PWM driving and PHM driving.

Instead of inputting a luminance signal obtained by multiplication of an image signal by a correction value to the X driver 203, the height of a scanning pulse output from the Y driver 202 can be corrected. Specifically, the height of a scanning pulse may be level shifted for each vertical line in accordance with a correction value. In the case of a luminance of 100%, the height (−8 V) of a scanning pulse output from the Y driver 202 for Y1 is shifted to −10 V. The heights for Y2 to Y279 are monotonically decreased in the range of −10 V to −8 V. The heights for Y280 to Y1080 are shifted to −8 V.

Figure 7:
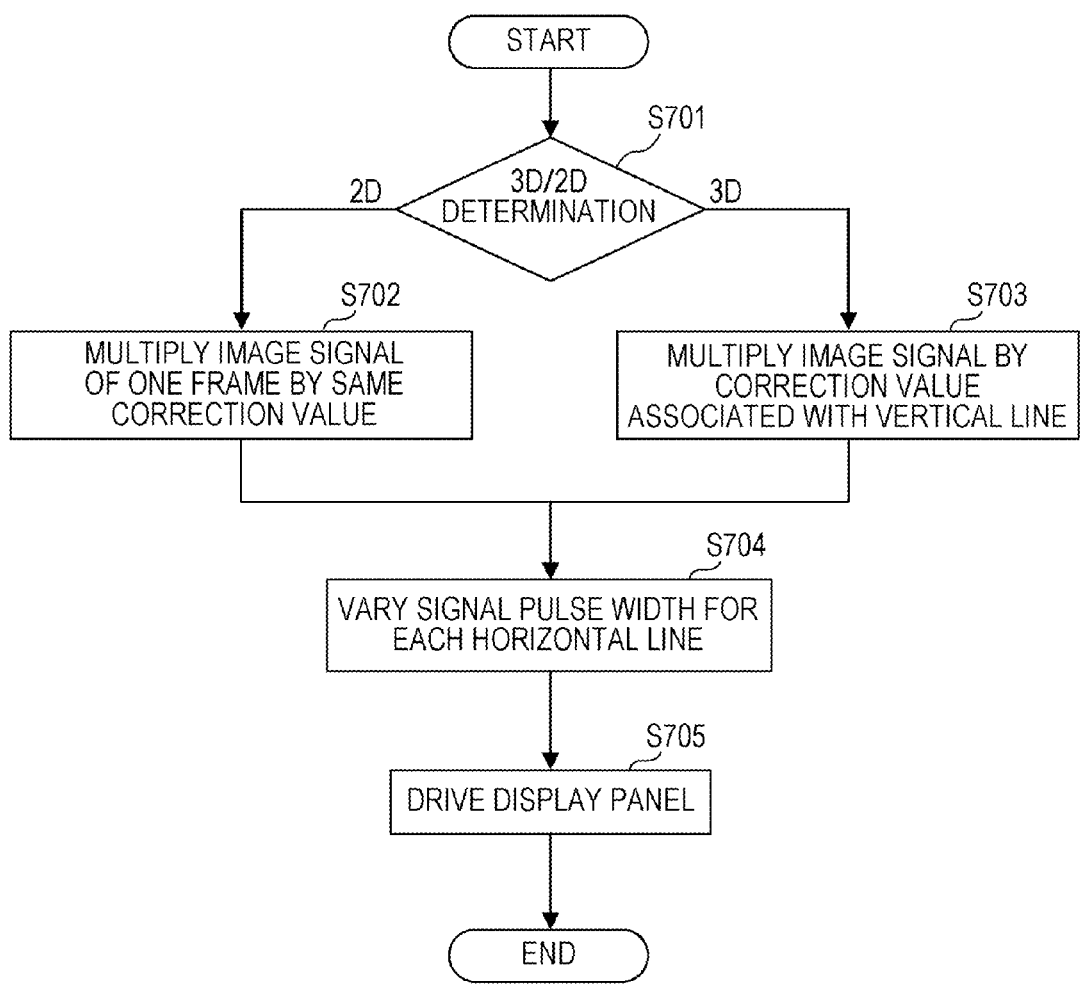
FIG. 7 is a flowchart of an operation according to another embodiment of the present invention.

Furthermore, according to the present invention, whether an input image signal is for 3D image display (3D) or non-3D image display (2D) can be determined and signal processing by the image processing circuit 103 can be switched between 3D and 2D. FIG. 7 is a flowchart illustrating an operation of the image control apparatus based on an input image signal.

Whether an input image signal is for 3D or 2D is determined (S701). When the input source is a digital broadcast, whether a selected program is a 3D program or not can be determined with reference to previously acquired program information. In the case of another input source, the determination can be performed with reference to header information of a video stream.

When the input image signal is for 3D, signal processing by the image processing circuit 103 is set to processing for 3D on the basis of an instruction from the MPU 105, thus performing processing of multiplying the image signal by correction values (1.43 to 1.0) associated with vertical lines, illustrated in FIG. 3A, to output luminance signals (S703).

When the input image signal is for 2D, signal processing by the image processing circuit 103 is set to processing for 2D on the basis of an instruction from the MPU 105, thus performing processing of multiplying an image signal of one frame by the same correction value (1.43) to output luminance signals (S702). In the case where the input image signal is for 2D, luminance signals may be generated without being multiplied by a correction value.

The width of each signal pulse is set for each horizontal line on the basis of the luminance signals (S704). The display panel is driven using driving pulses set for 3D or 2D (S705).

As described above, when the input image signal is for 3D, an observed image with even luminance can be viewed. When it is for 2D, a display image with optimized luminance on the entire screen can be viewed.

According to the present invention, an image signal is corrected according to a region on a screen of a display device, thus preventing unevenness of luminance in an observed image on a screen caused in a 3D image viewing system including an impulse type display device and liquid crystal shutter glasses. As a result, a 3D image control apparatus allowing high quality 3D viewing is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A three-dimensional (3D) image control apparatus that allows a display unit to alternately display a right eye image and a left eye image in a time-division manner and allows right and left shutters of shutter glasses to alternately open and close synchronously with switching between the right eye image and the left eye image, the apparatus comprising:
   an input unit configured to receive an image signal for displaying a 3D image; and
   an image processing unit configured to generate luminance signals for displaying the right eye image and the left eye image based on the image signal and output the signals to the display unit,
   wherein the display unit sequentially selects scanning lines in order from a scanning line at which scanning starts to a scanning line at which the scanning ends for a predetermined vertical scanning period to generate an image on a screen, and
   the image processing unit corrects the image signal such that the luminances of pixels on each of predetermined number of scanning lines scanned for a period corresponding to at least one of a rising period and a falling period of the shutters,
   are increased relative to those of pixels on scanning lines other than the predetermined number of scanning lines in accordance with the position of the scanning line.

2. The 3D image control apparatus according to claim 1, wherein the predetermined number of scanning lines is determined based on at least one of the rising period and the falling period of the shutters.

3. The 3D image control apparatus according to claim 1, wherein the image processing unit multiplies an image signal corresponding to pixels on the predetermined number of scanning lines from the scanning line, which is positioned at the top of the screen and at which the scanning starts, to the lower scanning line by correction values to generate the luminance signals, wherein the correction value decreases monotonically from the correction value associated with the scanning line positioned at the top of the screen to the correction value associated with the scanning line positioned downward.

4. The 3D image control apparatus according to claim 1, further comprising;
a control unit configured to control jointly the input unit and the image processing unit, wherein the control unit determines a horizontal scanning period for each scanning line at least every frame on the basis of a maximum luminance signal
associated with pixels on the scanning line without changing the vertical scanning period.

5. The 3D image control apparatus according to claim 1, wherein the vertical scanning period includes a vertical blanking period and the vertical blanking period is determined based on a falling period of the shutters.

6. A three-dimensional (3D) image control method for allowing a display unit to alternately display a right eye image and a left eye image in a time-division manner and allows right and left shutters of shutter glasses to alternately open and close synchronously with switching between the right eye image and the left eye image, the method comprising:
an inputting step of receiving an image signal for displaying a 3D image; and
a generating step of generating luminance signals for displaying the right eye image and the left eye image based on the image signal to output the signals to the display unit,
wherein the display unit sequentially selects scanning lines in order from a scanning line at which scanning starts to a scanning line at which the scanning ends for a predetermined vertical scanning period to generate an image on a screen, and
in the generating step, the luminances of pixels on each of a predetermined number of scanning lines scanned for a period corresponding to at least one of a rising period and a falling period of the shutters,
are increased relative to those of pixels on scanning lines other than the predetermined number of scanning lines in accordance with the position of the scanning line.

7. The 3D image control method according to claim 6, wherein the predetermined number of scanning lines is determined based on at least one of the rising period and the falling period of the shutters.

8. The 3D image control method according to claim 6, further comprising multiplying an image signal corresponding to pixels on the predetermined number of scanning lines from the scanning line,
which is positioned at the top of the screen and at which the scanning starts, to the lower scanning line by correction values to generate the luminance signals,
wherein the correction value decreases monotonically from the correction value associated with the scanning line positioned at the top of the screen to the correction value associated with the scanning line positioned downward.

9. The 3D image control method according to claim 6, further comprising determining a horizontal scanning period for each scanning line at least every frame based on a maximum luminance signal associated with pixels on the scanning line without changing the vertical scanning period.

10. The 3D image control method according to claim 6, wherein the vertical scanning period includes a vertical blanking period and the vertical blanking period is determined based a falling period of the shutters.

* * * * *